Figure 5:
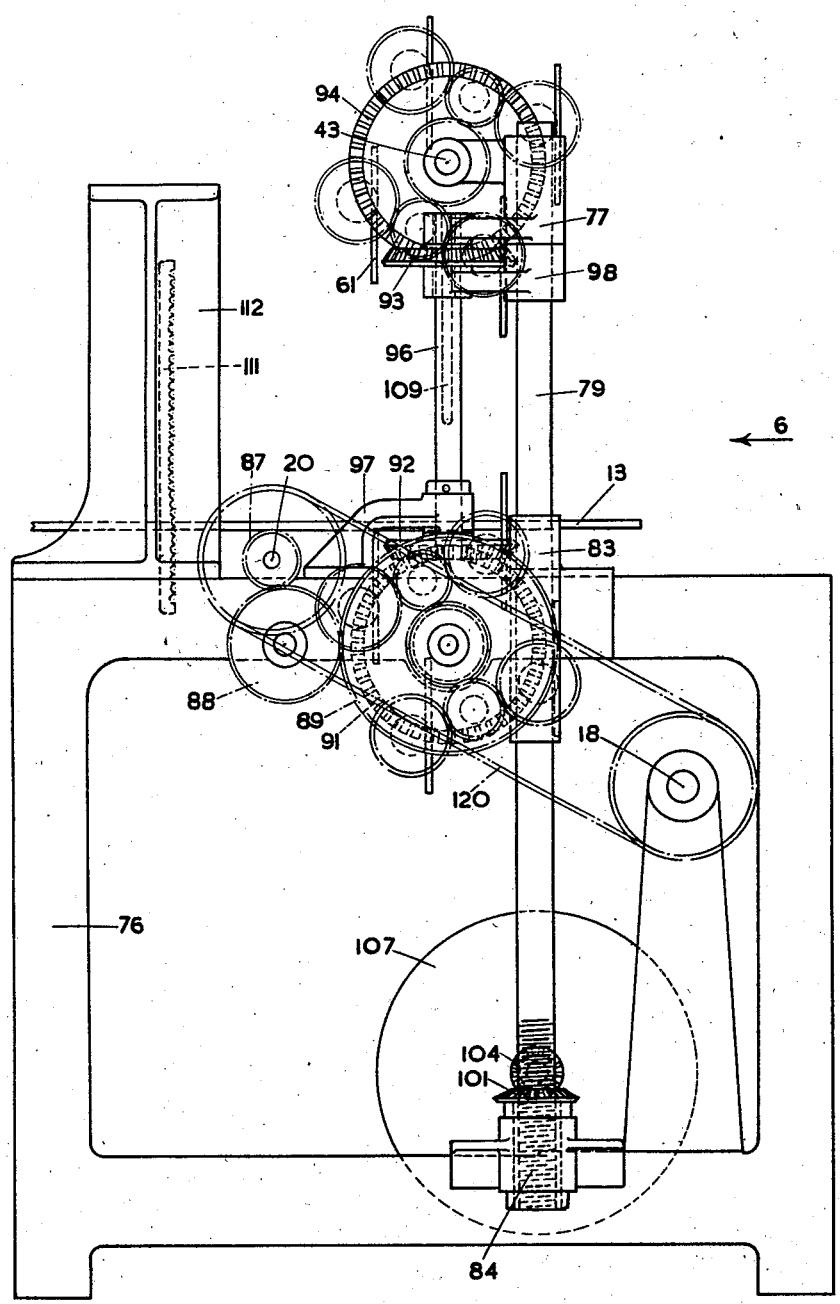

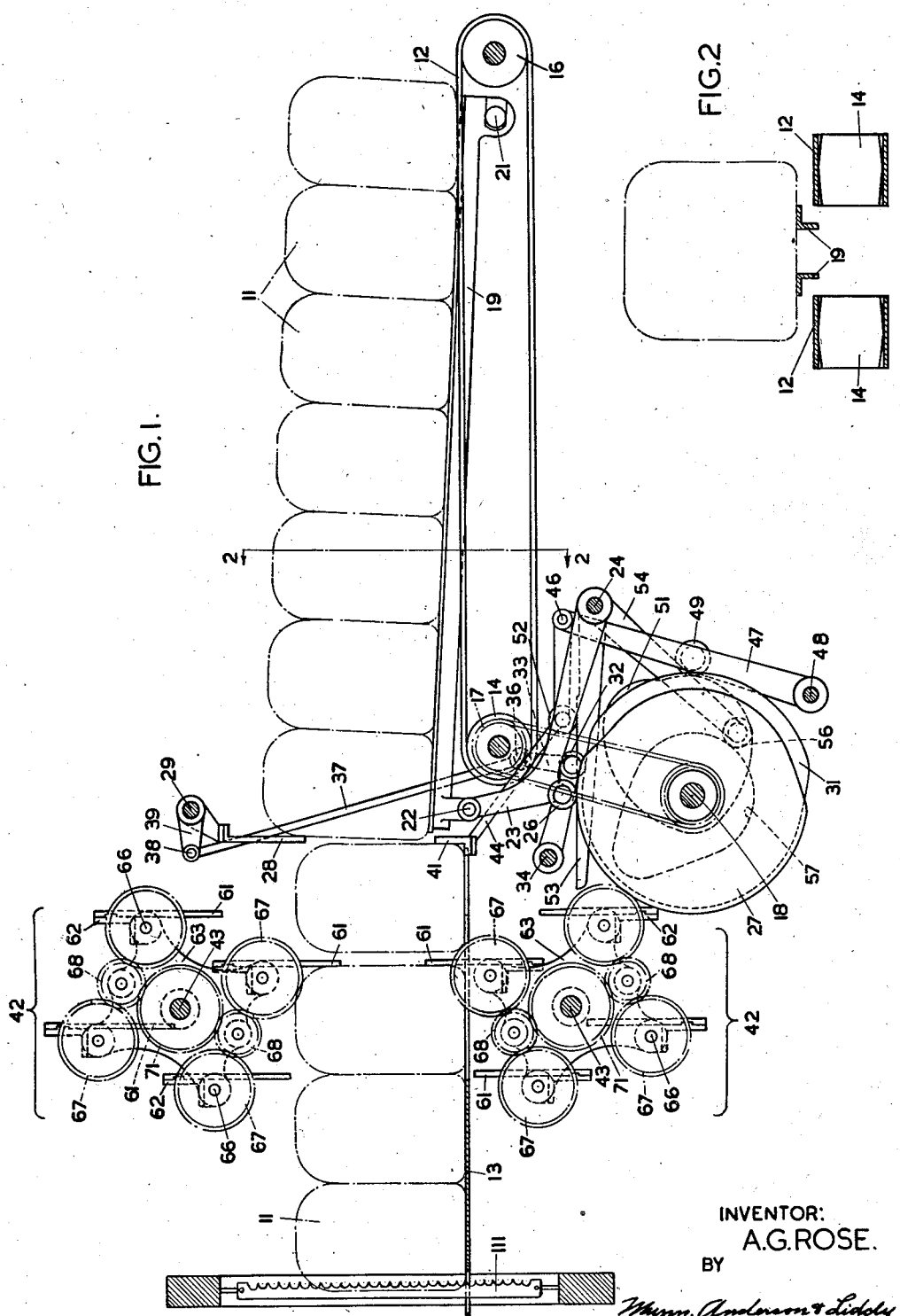
Aug. 11, 1942.  A. G. ROSE  2,292,800
FEEDER FOR SLICING MACHINES
Filed Jan. 28, 1941  4 Sheets-Sheet 1
INVENTOR:
A.G. ROSE.
BY
ATTORNEYS Aug. 11, 1942. A. G. ROSE 2,292,800
FEEDER FOR SLICING MACHINES
Filed Jan. 28, 1941 4 Sheets-Sheet 2
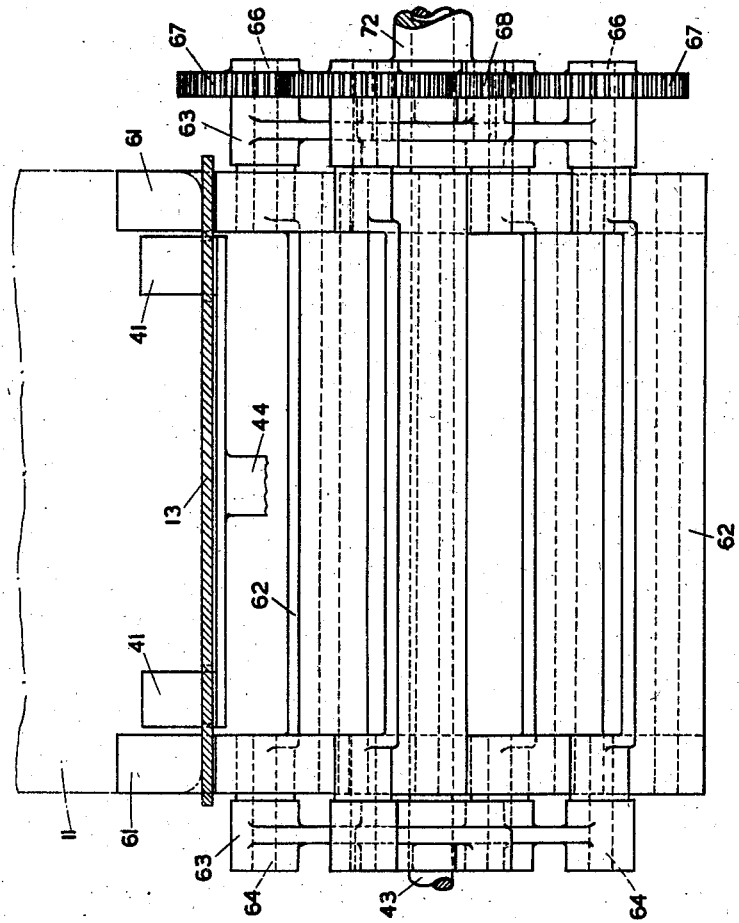
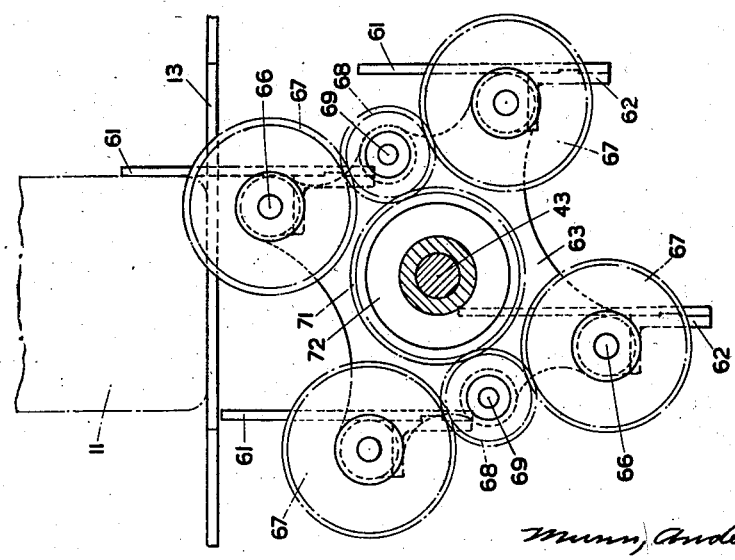
INVENTOR:
A.G. ROSE.

Patented Aug. 11, 1942

2,292,800

UNITED STATES PATENT OFFICE 2,292,800

FEEDER FOR SLICING MACHINES

Alfred German Rose, Gainsborough, England, assignor to Rose Brothers (Gainsborough) Limited, Gainsborough, England, a British company Application January 28, 1941, Serial No. 376,281
In Great Britain October 7, 1939

8 Claims. (Cl. 198—82)

The invention relates to the feeding of loaves of bread to slicing knives and has for an object the provision of a simple feeding device for this purpose which may be used to give a substantially continuous feed to the knives.

The invention consists in a device for feeding loaves of bread (particularly Scotch loaves) to slicing knives comprising a set (e. g., four) of flights mounted on an epicyclic gear train in such a manner that as the gears are rotated the flights remain parallel to one another, the flights being arranged, as the gears are rotated, to engage successive loaves and to push them along a supporting table or the like to the slicing knives.

In the preferred form of the invention there are two sets of flights each arranged as above and so located as to engage the top and bottom or opposite sides of the loaves respectively, the flights in each set being so disposed that when any two successive flights are at their maximum distance apart (considered in the direction of travel of the loaves), the distance between them is greater than the thickness of the loaves by an amount just sufficient to ensure the smooth feeding of the loaves between the flights.

It is particularly desirable in the operation of bread slicing machines that the feed of each loaf through the slicing knives should be continuous because if the loaves remain stationary, even for a short time, the slicing knives tend to produce an undue amount of crumbs. In order to ensure substantially continuous movement of the loaves through the knives in the present machine the arrangement is preferably such that there are several loaves (say three) between the rearmost flight in engagement with the loaves and the knives so that the resilience of the loaves tends to maintain the feed to the knives as the leading flights are withdrawn from between the loaves. The machine may, however, if desired, be so arranged that there is only one loaf between the flights and the knives, and the machine may also, if desired, be arranged to feed only one loaf at a time.

The feeding device according to the invention may include a reciprocatory pusher to feed the loaves along a feeding platform to the flights and it may also include a conveyor for supplying the loaves to the feeding platform. In one form of the device the loaves are placed by hand on the conveyor which consists of an endless belt arranged to feed the loaves along a slide to the feeding platform and, as the loading loaf is delivered on to the feeding platform to be taken charge of by the pusher, the supply of loaves to the feeding platform is stopped by lifting the slide and the loaves which it carries off the belt. There may in addition be a positive stop arranged to prevent movement of the loaves along the slide as it is lifted off the belt.

The conveyor may, however, if desired, be of the positive feed type, consisting of a pair of parallel chains supported on sprockets and having transverse pusher bars pivoted to the chains at spaced intervals along their length, guides being provided for maintaining the pusher bars in an upright position during their feeding operation and during their movement round the sprockets after pushing the loaf on to the feeding platform. With this type of conveyor, the feeding platform is preferably made to incline downwardly towards the flights to allow the loaf to slide towards the flights as it is delivered to the feeding platform by the pusher bar.

One specific example of a feeding device according to the invention will now be described in greater detail with reference to the accompanying drawings, which are somewhat diagrammatic, in which—

Figure 6:
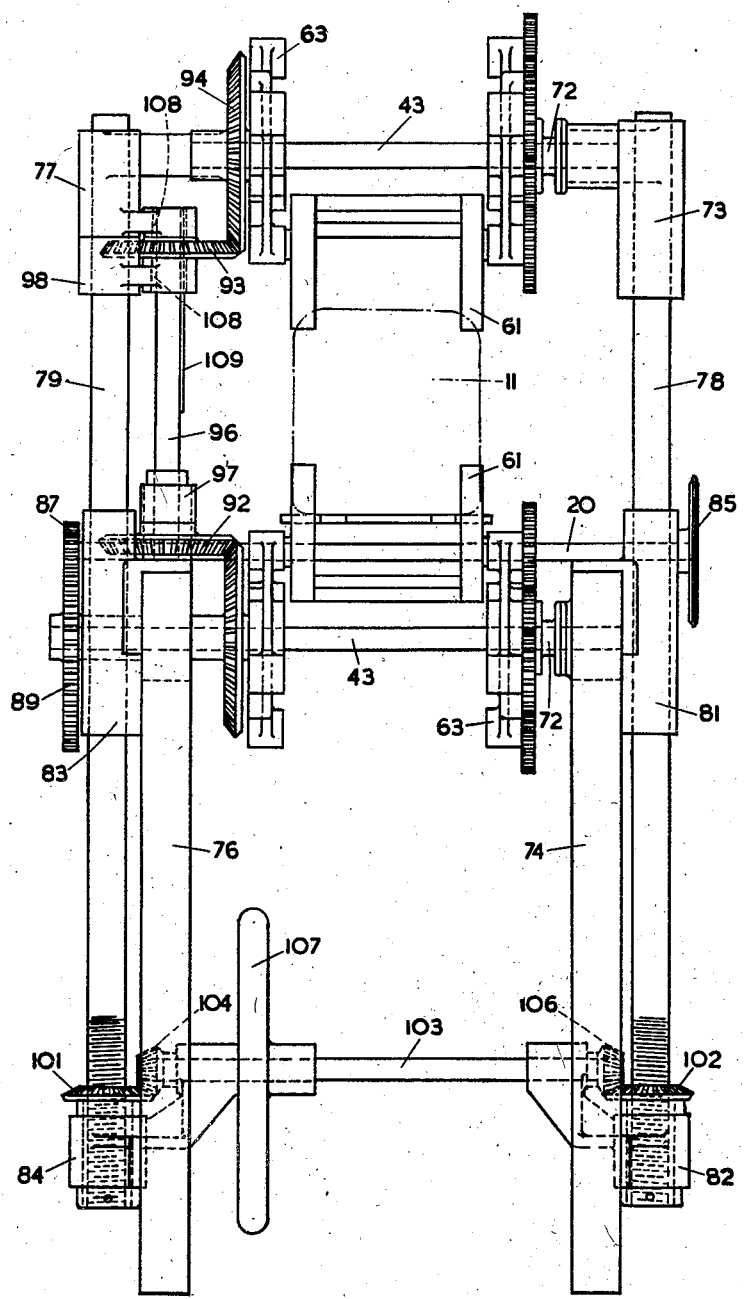

Figure 1 is a sectional elevation showing the salient features of a device for feeding loaves of bread to a slicing machine, Figure 2 is a sectional view, taken on the line 2—2 on Figure 1, of a detail of the apparatus shown in Figure 1, Figure 3 is an elevation, drawn to an enlarged scale, of a detail of the apparatus shown in Figure 1, Figure 4 is an end view of the apparatus shown in Figure 3, Figure 5 is an elevation similar to Figure 1 showing the driving connection between the various parts of the apparatus, and Figure 6 is an end view of the apparatus shown in Figure 5, viewed in the direction of the arrow 6.

Referring to Figures 1 to 3, loaves 11 are placed by hand on to a conveyor consisting of a pair of parallel belts 12 which carry the loaves 11 towards a feeding platform 13. The belts 12 are mounted on rollers 14 and 16 and are driven through chain and sprocket gearing 17 by a shaft 18 which, in turn, is driven from a main-shaft 20 (see Figure 5) by chain and sprocket gearing 120. Mounted between the conveyor belts 12 is a slide 19 pivoted at 21 and lying, during the feeding operation of the belts at substantially the same level as the upper lap of the belts. The slide 19 consists of a pair of rails disposed between the belts 12 and spaced apart in the direction of the width of the loaves, the rails being pivotally mounted on a shaft 22 extending transversely of the conveyor. Pivotally connected to each end of the shaft 22 is an arm 23 pivoted on a shaft 24 and carrying a cam roller 26 arranged to bear against the face of a cam 27 secured to the shaft 18, the two cams 27 being identical in profile and arranged to rock the arms 23 in synchronism. The slide 19, as mentioned above, lies at substantially the same level as the belts 12 during the feeding of the loaves 11 towards the feeding platform 13, so that the loaves are pushed along the slide 19 by the belts 12. As the foremost loaf on the slide 19 is pushed by the succeeding loaves on to the feeding platform 13, the cams 27 operate to rock the arms 23 about the shaft 24 and so cause the slide 19 to rock about its pivot 21 to lift the loaves on the slide clear of the belts and thus stop for the time being the feeding of the loaves (see Figure 1). As the slide 19 commences to lift, a loaf stop plate 28 is arranged to rock about a shaft 29 into the position shown in Figure 1 to prevent any further movement of the loaves after they have been lifted clear of the belts 12. The rocking of the stop plate 28 is brought about by the action of a cam 31, secured to the shaft 18, on a roller 32 attached to an arm 33 pivoted at 34 and connected at 36 to one end of a link 37 the other end of which is connected at 38 to an arm 39 pivoted on the shaft 29 and secured to the stop plate 28.

As the foremost loaf on the guide 19 is delivered to the feeding platform 13, as described above, a pusher member 41 moves into position behind the loaf and pushes it forward along the feeding platform 13, which is slotted for the passage of the pusher member, towards two loaf-feeding devices (described later), generally indicated by reference numeral 42. The loaf-feeding devices are mounted one directly above the other, on shafts 43, with the feeding platform 13 extending between them.

The pusher member 41 is supported on an arm 44 pivotally connected at 46 to an arm 47, the arm 47 being pivoted on a shaft 48 and carrying a cam roller 49 arranged to bear against the face of a cam 51 secured to the shaft 18. The arm 44 is also provided with a supporting roller 52 arranged to run along a guide 53 pivotally mounted on the shaft 24 and provided with an arm 54 carrying a roller 56 which is arranged to bear against the face of a cam 57 secured to the shaft 18.

The cams 51 and 57 are arranged to operate in timed relation to each other and to the cams 27 to cause the pusher member 41 to move upwardly into a position behind the loaf just delivered to the feeding platform 13 (see Figure 1) as the slide 19 rocks to stop the feed of the loaves, then to move forwardly to push the loaf along the feeding platform 13 into the load-feeding devices 42 and then to dip below the level of the feeding platform 13 and return to its original position in readiness for the next load delivered to the feeding platform 13. For clarity of illustration, no means have been shown for maintaining contact between the various cam rollers and their respective cams. Such contact may, however, be maintained by means of springs in well-known manner.

The loaf-feeding devices 42 are of similar construction, each comprising a set of four pairs of flights 61 mounted on supports 62 extending between a pair of carrier members 63 secured to one of the shafts 43. The supports 62 are rotatably mounted on the carrier members 63 by means of studs 64 and 66 secured to the supports 62 and having bearings in the carrier members 63, the axes of the studs 64 and 66 lying at equidistant points on circles struck from the centre of the shaft 43. The studs 66 extend through their bearings in the carrier member 63 and have secured thereto gears 67. The gears 67 are geared together in pairs (see Figure 3) by intermediate gears 68 rotatably mounted on studs 69 supported in the corresponding carrier member 63. The intermediate gears 68 are in geared connection with a stationary gear 71 having the same number of teeth as the gears 67. The gear 71 is mounted on a stationary flange 72 which, in the case of the upper feeding device 42, is secured to a bracket 73, and in the case of the lower feeding device 42 is secured to the frame 74 of a pair of main frames 74, 76 (see Figure 6).

The loaf-feeding devices 42 are arranged to rotate in synchronism, the flights being set vertically and arranged so that corresponding flights in the two feeding devices engage the rear face of a loaf at the same time. It will be seen that, as the carrier members 63 rotate, the intermediate gears 68 roll around the stationary gears 71 and in so doing impart motion to the gears 67 in the opposite direction to the direction of rotation of their respective carrier members 63, and since the gears 67 and 71 have the same number of teeth, the flights, whilst being rotated bodily in the feeding direction by the carrier members, are caused to remain in a vertical position throughout the feeding operation. The pairs of flights 61 in each loaf-feeding device 42 are so disposed on their carrier members 63 that when any two successive pairs of flights are at their maximum distance apart (considered in the direction of travel of the loaves), the distance between them is greater than the thickness of the loaves by an amount just sufficient to ensure the smooth feeding of the loaves between the successive pairs of flights.

The driving connection between the two feeding devices 42 is shown in Figures 5 and 6 from which it will be seen that the upper shaft 43, carrying the upper feeding device 42, is rotatably supported at one end in a bracket 77 and at the other end in the bracket 73, the brackets 73 and 77 being secured respectively to vertical pillars 78 and 79. The pillars 78 and 79 are supported respectively on the frames 74 and 76 by means of brackets 81, 82 and 83, 84. The drive to the shafts 43 is obtained from the main shaft 20 which is driven through a sprocket 85 from a suitable source of power (not shown). Mounted on the main shaft 20 is a gear 87 which drives, through an intermediate gear 88, a gear 89 secured to the lower shaft 43, which is rotatably supported in the frames 74 and 76. The upper shaft 43 is driven from the lower shaft 43 through pairs of bevel gears 91, 92 and 93, 94, the bevel gears 92 and 93 being mounted on a vertical shaft 96, carried at its lower end in a bracket 97 mounted on the frame 76, and at its upper end in a bearing carried by the bracket 77 and a further bearing carried by a bracket 98.

For the purpose of adjusting the upper feeding device 42 in relation to the lower feeding device 42 to accommodate loaves of different height, the pillars 78 and 79 carrying the upper feeding device 42 are slidably mounted in their supporting brackets and at their lower ends are screwed for engagement with the tapped bores of a pair of bevel gears 101 and 102 housed respectively in the brackets 84 and 82. Also mounted in bearings in the brackets 82 and 84 is a cross shaft 103 carrying a pair of bevel gears 104 and 106 meshing respectively with the bevel gears 101 and 102. A handwheel 107 is secured to the shaft 103 and it will be seen that by rotating the handwheel 107 the pillars 78 and 79 are caused to move upwardly or downwardly depending on the direction of the rotation of the handwheel 107 to adjust the upper feeding device 42 in relation to the lower feeding device 42. To permit this adjustment without interfering with the drive between the lower and upper shafts 43, the bevel gear 93 is provided with a pair of hubs 108 and is slidably mounted on the shaft 96, the hubs 108 running in bearings in the bracket 77. The drive is maintained by a feather key 109 inserted in the shaft 96.

In operation the loaves 11 are carried forward by the belts 12 and delivered one at a time to the feeding platform 13 along which they are pushed by the pusher member 41 towards the flights 61 of the feeding devices 42. The pusher member 41 pushes each loaf up to the flights 61 in engagement with the preceding loaf and causes the loaf to follow those flights until such time as the next succeeding flights move into position behind the loaf to push it forward, when the pusher member 41 returns as described above. The flights then push the loaf forward along the feeding platform 13 where it abuts against the preceding loaf, after the preceding flights have been withdrawn, and continue to push that loaf and the preceding loaves forward through slicing knives 111 arranged for vertical reciprocation in slides mounted on frames 112. It will be seen from Figure 1 that there are at least two complete loaves between the rearmost flights in engagement with a loaf and the slicing knives, it being found that the resilience of the loaves themselves tends to maintain the feed of the loaves to the slicing knives during the withdrawal of the leading flights from between the loaves so that the loaves are fed to the slicing knives in a substantially continuous manner.

When the feeding devices 42 are driven in synchronism with a wrapping machine, the combined apparatus has the advantage that the feed is positive and ensures that a complete loaf will be fed through the slicing knives 111 for each operation of the wrapping machine.

I claim:

1. A device for feeding loaves of bread or like material to slicing knives, comprising a rotatable carrier member, a set of flights pivotally mounted on the carrier member about axes parallel to the axis of rotation of the carrier member, said axes lying at equidistant points on a circle struck from the centre of rotation of the carrier member, said flights being geared together for simultaneous rotation about their axes by an epicyclic gear train in such a manner that upon rotation of the carrier member the flights remain parallel to each other, a feeding platform, a conveyor consisting of a pair of travelling belts, a slide disposed between the belts and along which the loaves are pushed on to the feeding platform by the belts, and a reciprocating pusher adapted to feed the loaves along the feeding platform to the flights, said flights being arranged upon rotation of the carrier member to engage successive loaves and to push them along the feeding platform to the slicing knives.

2. A device according to claim 1, wherein the slide is arranged for pivotal movement about an axis transverse to the direction of travel of the belt.

3. A device for feeding loaves of bread or like material to slicing knives, comprising a rotatable carrier member, a set of flights pivotally mounted on the carrier member about axes parallel to the axis of rotation of the carrier member, said axes lying at equidistant points on a circle struck from the centre of rotation of the carrier member, said flights being geared together for simultaneous rotation about their axes by an epicyclic gear train in such a manner that upon rotation of the carrier member the flights remain parallel to each other, a feeding platform, a conveyor consisting of a pair of travelling belts, a slide disposed between the belts and along which the loaves are pushed on to the feeding platform by the belts, said slide being arranged for pivotal movement about an axis transverse to the direction of travel of the belt, a reciprocating pusher adapted to feed the loaves along the feeding platform to the flights, means for rocking the slide to stop the feeding of the loaves by the belt during the operation of the pusher, and a movable stop member adapted to move into position against the foremost loaf on the slide to prevent further movement of the loaves along the slide during the rocking of the slide.

4. A device for feeding loaves of bread or like material to slicing knives, comprising a rotatable carrier member, a set of flights pivotally mounted on the carrier member about axes parallel to the axis of rotation of the carrier member, said axes lying at equidistant points on a circle struck from the centre of rotation of the carrier member, a planetary gear attached to each flight, a stationary sun gear arranged on the axis of the carrier member, intermediate gears rotatably mounted on the carrier member and connecting the planetary gears with the sun gear, so that upon rotation of the carrier member the flights remain parallel to each other, a feeding platform, a conveyor consisting of a pair of travelling belts, a slide disposed between the belts and along which the loaves are pushed on to the feeding platform by the belts, said slide being arranged for pivotal movement about an axis transverse to the direction of travel of the belts, a reciprocating pusher adapted to feed the loaves along the feeding platform to the flights, said flights being arranged upon rotation of the carrier member to engage successive loaves and to push them along the feeding platform to the slicing knives, and means for rocking the slide to stop the feeding of the loaves by the belts during the operation of the pusher.

5. A device for feeding loaves of bread or like material to slicing knives, comprising a pair of rotatable carrier members disposed one directly above the other, a set of flights pivotally mounted on each of the carrier members about axes parallel to the axis of rotation of the respective carrier member, said axes lying at equidistant points on a circle struck from the centre of the carrier member, each set of flights being geared together for simultaneous rotation about their axes by an epicyclic gear train in such a manner that upon rotation of the carrier members the flights remain parallel to each other, the flights of the upper and lower sets being arranged to engage the top and bottom respectively of the rear faces of the loaves and to push them along a supporting table or the like to the slicing knives, means for driving the two carrier members in synchronism, and means for pushing the loaves separately into flight-engaging position in timed relation to the movement of the flights.

6. A device for feeding loaves of bread or like material to slicing knives, comprising a pair of rotatable carrier members disposed one directly above the other, a set of flights pivotally mounted on each of the carrier members about axes parallel to the axis of rotation of the respective carrier member, said axes lying at equidistant points on a circle struck from the center of the carrier member, a planetary gear attached to each flight, a stationary sun gear arranged on the axis of each of the carrier members, intermediate gears rotatably mounted on the carrier members and connecting the planetary gears of each set of flights to their respective sun gear, so that upon rotation of the carrier members the flights remain parallel to each other, the flights of the upper and lower sets being arranged to engage the top and bottom respectively of the rear faces of the loaves and to push them along a supporting table or the like to the slicing knives, means for driving the two carrier members in synchronism, means for pushing the loaves separately into flight-engaging position in timed relation to the movement of the flights, and means for adjusting the carrier members relatively to each other so as to be capable of accommodating loaves of different height.

7. A device according to claim 6, wherein the pushing means comprises a reciprocating pusher.

8. A device according to claim 6, comprising a feeding platform, a conveyor consisting of a pair of travelling belts, a slide disposed between the belts and along which the loaves are pushed on to the feeding platform by the belts, said slide being arranged for pivotal movement about an axis transverse to the direction of travel of the belt, a reciprocating pusher adapted to feed the loaves along the feeding platform to the flights, and means for rocking the slide to stop the feeding of the loaves by the belt during the operation of the pusher.

ALFRED GERMAN ROSE.